(12) United States Patent
Zhou et al.

(10) Patent No.: US 7,199,695 B1
(45) Date of Patent: Apr. 3, 2007

(54) MULTIPHASE VOLTAGE REGULATOR HAVING COUPLED INDUCTORS WITH REDUCED WINDING RESISTANCE

(75) Inventors: Jinghai Zhou, Blacksburg, VA (US); Fred C. Lee, Blacksburg, VA (US); Ming Xu, Blacksburg, VA (US); Yan Dong, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 11/257,404

(22) Filed: Oct. 25, 2005

(51) Int. Cl.
*H01F 27/24* (2006.01)
(52) U.S. Cl. ..................................... 336/212
(58) Field of Classification Search ................ 336/212
See application file for complete search history.

(56) References Cited

U.S. PATENT DOCUMENTS

2004/0113741 A1* 6/2004 Li et al. ..................... 336/212
2006/0145800 A1* 7/2006 Dadafshar et al. ............ 336/82

* cited by examiner

*Primary Examiner*—Elvin Enad
*Assistant Examiner*—Joselito Baisa
(74) *Attorney, Agent, or Firm*—Whitham Curtis Christofferson & Cook, PC

(57) ABSTRACT

A multiple phase buck converter or boost converter, or buck-boost converter has an inductor in each phase. A magnetic core with a unique woven topology provides inverse coupling between the inductors. The inductors can comprise straight conductors since the magnetic core has the woven topology wrapped around each inductor. The inductors have a reduced electrical resistance since they are straight and do not loop around the magnetic core. The reduced electrical resistance increases energy efficiency and improves transient response of the circuit. The magnetic core can comprise top and bottom portions that are magnetically connected. The inductors can comprise straight circuit board traces and the circuit board can have holes to accommodate the magnetic core.

15 Claims, 7 Drawing Sheets

MULTIPHASE VOLTAGE REGULATOR HAVING COUPLED INDUCTORS WITH REDUCED WINDING RESISTANCE

FIELD OF THE INVENTION

The present invention relates generally to multiphase voltage regulators (e.g. buck or boost regulators) with an inductor in each phase. More particularly, the present invention provides a coupled inductor design with reduced winding resistance. The present invention employs magnetic cores with a novel woven topology that allows the use of straight or nearly straight conductors for the inductors and thereby reduced electrical resistance.

BACKGROUND OF THE INVENTION

Buck converters are commonly used to change the voltage or polarity of a DC power supply. Typically, a buck converter will have several phases connected in parallel; each phase having two switches (top and bottom switches) connected to an inductor. Such multiple phase buck converters are well known in the art and are commonly used for providing regulated DC power for microprocessors, telecommunications electronics and the like.

In recent years it has been discovered that efficiency and transient response of a multiple phase buck converter can be improved by coupling the inductors of several phases. Coupling inductors tends to decrease output current ripple, and thereby reduce the conduction loss in the switches. However, the extra conductor windings required for the coupled inductors increases the electrical resistance of the circuit, which adversely affects the energy conversion efficiency. Also, the use of a winding in the output circuit requires an additional copper layer on the printed circuit board, which tends to increase the cost.

It would be an advance in the art of voltage converter design to provide a multiple phase buck converter or boost converters having coupled inductors with exceptionally low output resistance. It would be particularly beneficial to provide coupled inductors that do not require multiple copper layers for the electrical conductors. Such a voltage converter would have exceptionally high power conversion efficiency, fast transient response, and lower cost.

SUMMARY

The present invention includes multiphase buck converters, boost converters, and buck-boost converters having first and second inductors in different phases. The inductors are non-looping (meaning that they do not form an arc of more than 90, 45, or 30 degrees around a magnetic core). The converter has a magnetic core with a woven topology that provides inverse coupling between the inductors.

The inductors are preferably straight and parallel electrical conductors. The inductors can comprise conductive traces on a printed circuit board. The printed circuit board can have holes to accommodate the magnetic core.

The magnetic core can have bottom portions with raised posts, and top portions that connect across the bottom portions.

The present invention also includes a buck or boost or buck-boost converter having first and second phases, and a magnetic core. Each phase has an inductor that is non-looping around the magnetic core. Switches are provided for alternately connecting the inductor to a voltage supply and ground. The magnetic core has a woven topology that provides inverse coupling between the inductors.

Preferably, the inductors comprise straight and parallel electrical conductors.

DETAILED DESCRIPTION

The present invention provides multiphase voltage converters (e.g. buck converters, boost converters, and buck-boost converters) having coupled inductors with reduced winding resistance. In a conventional, prior art multiphase converter with coupled inductors, the inductors each comprise electrical conductors wound around the magnetic core. In the present invention, by comparison, the conductors are straight (or nearly straight) and the magnetic core is wound around the conductors. The straight electrical conductors have lower electrical resistance. The woven topology of the magnetic core does not substantially increase the magnetic reluctance of the core, compared to a conventional straight magnetic core design. Consequently, the energy efficiency of the voltage converter is increased in the present invention. The present coupled inductor design can be used with buck type voltage converters, boost type voltage converters, and buck-boost type voltage converters.

Figure 1:
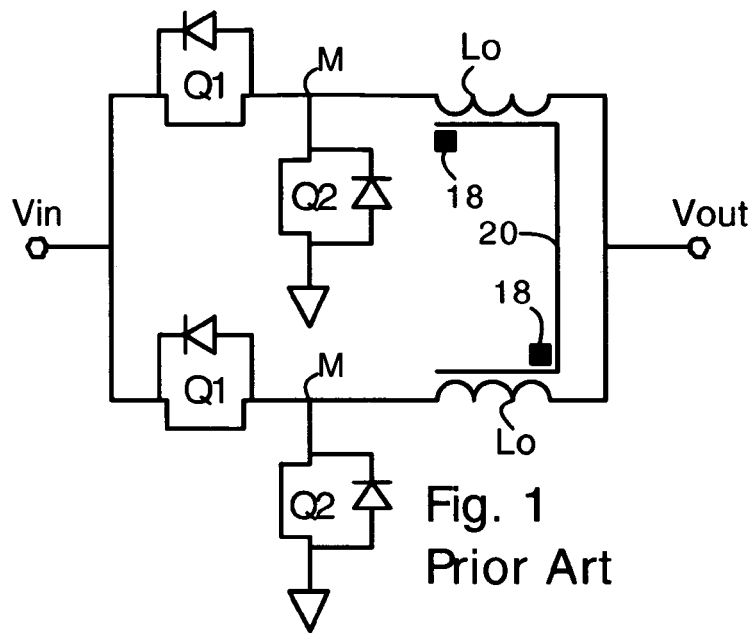
FIG. 1 (Prior Art) shows a circuit schematic of a 2-phase buck converter with coupled inductors.

FIG. 1 shows a schematic diagram of a 2-phase buck converter with coupled inductors Lo. Each phase has two switches connected in series between a voltage source Vin and ground. Each pair of switches is connected at a midpoint M. The inductors Lo are alternately charged and discharged by the switches, as known in the art. The inductors Lo are inversely coupled, which is indicated by the black squares 18 located on opposite sides of the inductors Lo. The inductors Lo are coupled by a magnetic core 20, which is typically made of ferrite or similar material, as known in the art.

Figure 2:
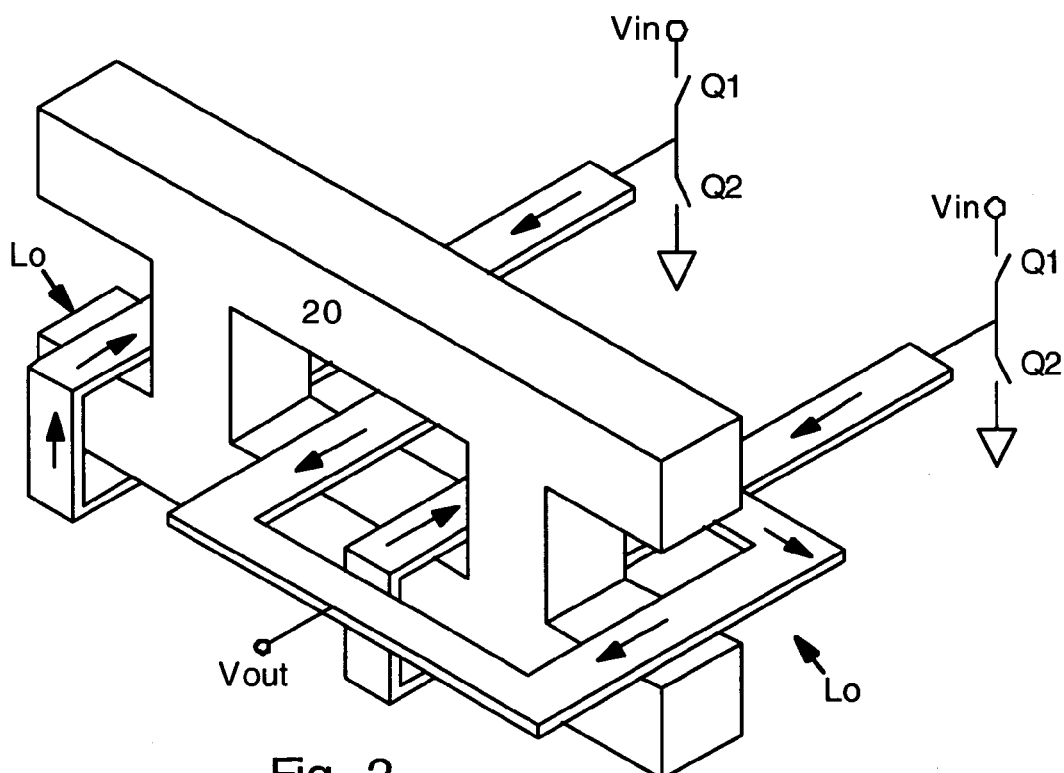
FIG. 2 (Prior Art) shows a conventional implementation of coupled inductors. The conventional implementation requires inductors having loops.
Figure 3:
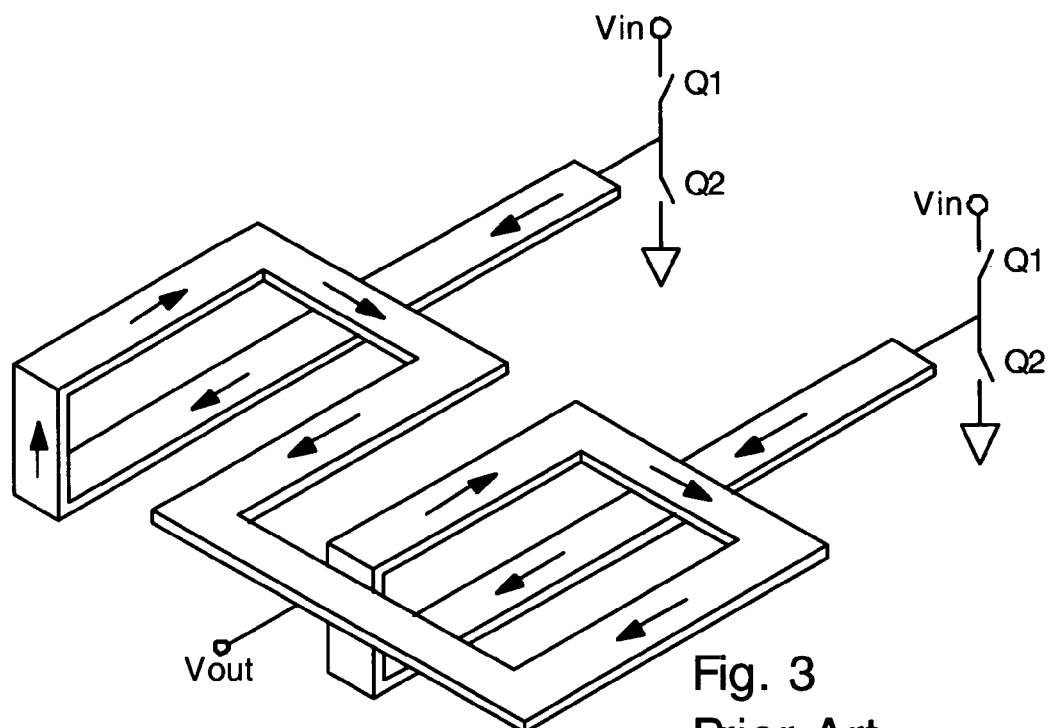
FIG. 3 (Prior Art) shows a perspective view of the inductors of FIG. 2 without the magnetic core.

FIG. 2 shows a perspective view of the inductors and magnetic core 20 of the prior art 2-phase buck converter of FIG. 1. Arrows indicate the direction of current flow. FIG. 3 shows a perspective view of the conductor traces present in the circuit of FIG. 2. For clarity, the magnetic core 20 is absent from FIG. 3. It is clear from FIGS. 2 and 3 that the inductors Lo comprise loops, and, consequently, have a relatively long length. Also, it is clear that the inductors Lo have conducting traces on two spaced apart planes. Typically the electrical conductors are copper traces bonded to the top and bottom (or interior) surfaces of a printed circuit board (not shown).

The relatively long length of the looped inductors, and the necessity of using conductor traces on two different planes, tends to increase the electrical resistance of the inductors. The increased electrical resistance reduces the energy conversion efficiency of the circuit, which of course is undesirable. Also, using conductor traces on multiple planes tends to increase the cost of the circuit.

Figure 4:
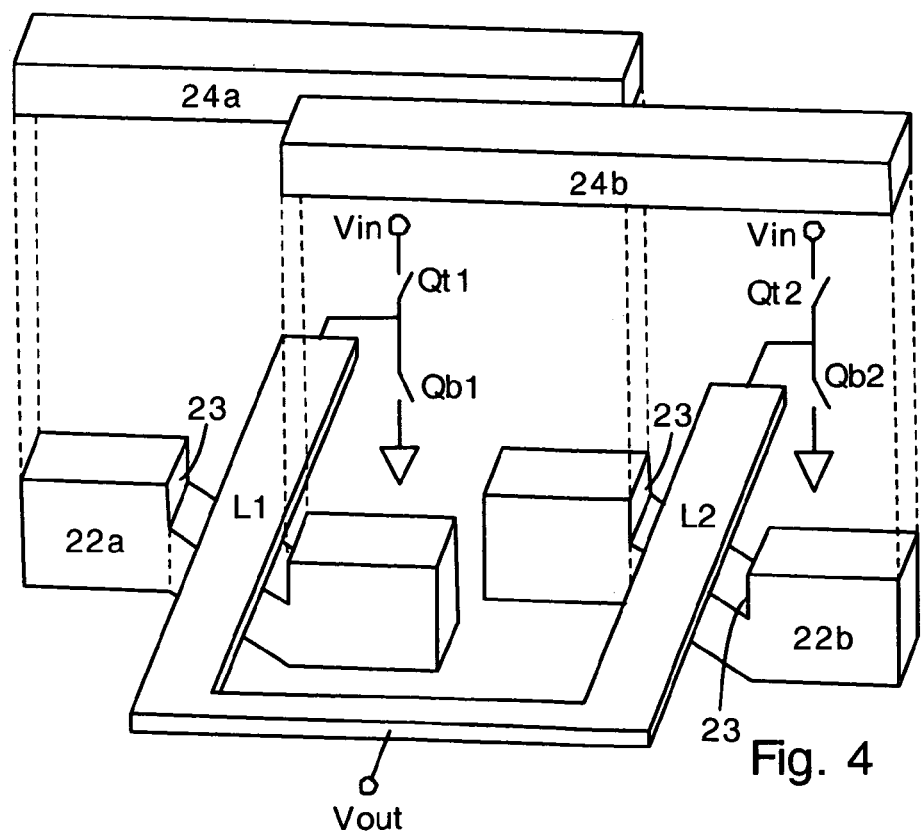
FIG. 4 shows an exploded perspective view of a 2-phase buck converter according to the present invention. The inductors are inversely coupled by a magnetic core with a woven topology.

FIG. 4, by comparison, shows an exploded perspective view of a multiphase buck converter of the present invention. The exemplary buck converter of FIG. 4 has two phases. A first phase includes top switch Qt1, bottom switch Qb1, and first inductor L1. A second phase includes top switch Qt2, bottom switch Qb2, and second inductor L2. The phases operate in parallel and are connected at the voltage output Vout. The inductors L1 L2 are preferably copper traces bonded to a printed circuit board (not shown), but can be any kind of electrical conductor.

The buck converter of FIG. 4 includes a magnetic core having bottom portions 22a 22b and top portions 24a 24b. The bottom portions 22a 22b have raised posts 23. The top portions 24a 24b are connected across the posts 23. The magnetic core can be made of any ferromagnetic material such as ferrite or laminated iron or steel. The magnetic core 22 24 has a woven topology that provides inverse magnetic coupling (i.e. a negative coupling coefficient) between the inductors L1 L2. The woven topology of the magnetic core 22 24 means that the magnetic core is looped around the straight inductors L1 L2.

In the present specification and appended claims, "woven topology" means that the magnetic core has the topology (pattern of connectedness) like that shown in FIGS. 4, 5, 6, 7, 8, 9, 11 and 13. The topology of the magnetic core may be the same as the topology shown in FIGS. 4, 5, 6, 7, 8, 9, 11, and 13. However, the shape of the magnetic core components can be varied within the scope of the present invention. For example, the magnetic core can comprise rectangular or rounded components, or 3 or more components instead of the two components (i.e. top 22 and bottom 24) shown in FIG. 4. The shape of the magnetic core can be varied in many ways in the present invention, provided that the topology is always like the woven topology shown.

Figure 5:
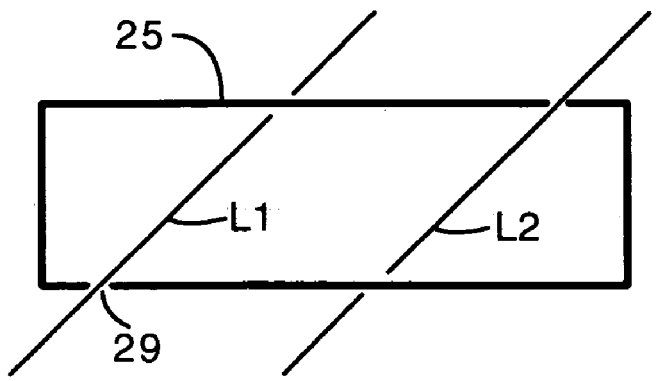
FIGS. 5 6 and 7 illustrate woven topologies according to the present invention for the magnetic core for converters having 2, 3, and 4 phases.
Figure 6:
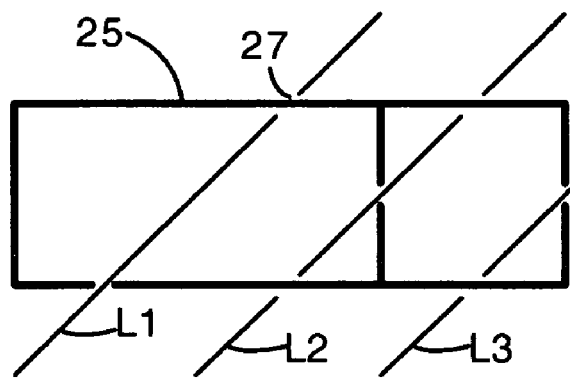
Figure 7:
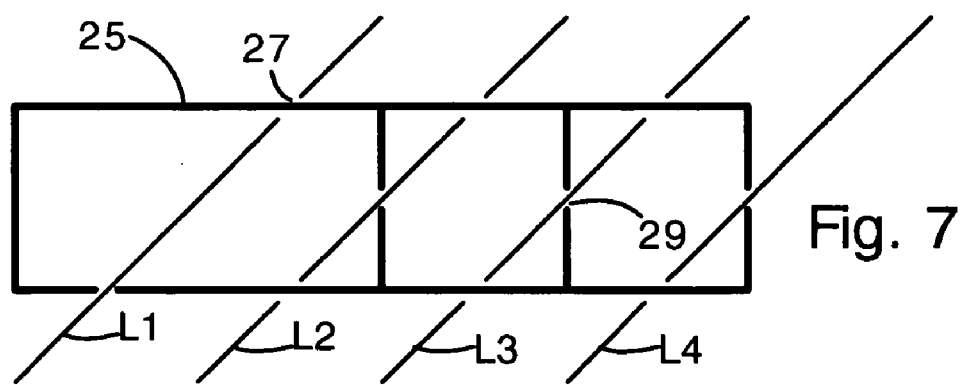

FIGS. 5, 6 and 7 illustrate the woven topology necessary for the magnetic core in voltage converter circuits having 2, 3 and 4 phases, respectively. The magnetic cores are represented by dark lines 25, and the inductors are represented by lines L1 L2 L3 L4. Gaps 27 in the inductor lines indicate places where the magnetic core 25 passes over an inductor. Gaps 29 in the magnetic core 25 indicate places where the magnetic core passes under an inductor. For example, the magnetic core of FIG. 4 has the woven topology illustrated in FIG. 5. FIGS. 5 6 and 7 are schematic in nature and represent a woven topology necessary in the present invention; FIGS. 5, 6 and 7 do not necessarily represent actual contemplated shapes of the magnetic core 25. In the present invention, the magnetic core can have any possible shape, provided that it has a woven topology like that of FIGS. 5, 6 and 7. In the present invention, circuits with more than 4 phases are contemplated and the necessary woven topologies for larger numbers of phases is a simple and obvious extension of the topologies illustrated in FIGS. 5, 6 and 7.

In the present invention, the inductors L1 L2 are non-looping. The inductors L1 L2 are preferably straight or substantially straight electrical conductors (e.g. copper circuit-board traces). The inductors L1 L2 can be somewhat curved if desired but are necessarily non-looping with respect to the magnetic core components. In the present specification and appended claims, "non-looping" means that the inductors do not form an arc of more than 90 degrees, or, more preferably, 45 or 30 or 15 degrees around the magnetic core components. Preferably, the inductors L1 L2 are straight conductors, as shown in FIG. 4. The inductors L1 L2 are also preferably parallel as illustrated in FIG. 4. However, the invention is not limited to parallel inductors. The inductors can be angled with respect to one another (e.g. perpendicular). In this case, the shape of the magnetic cores (but not the topology of the cores), must be altered to accommodate the nonparallel inductors.

In the present invention, the inductors will have a relatively low electrical resistance since they are non-looping (i.e. are not looped around the magnetic core). The lower resistance of the inductors will significantly increase the energy efficiency of the circuit. However, it is important to note that the woven topology of the magnetic core will tend to increase the magnetic reluctance of the magnetic core (i.e., compared to a simple toroidal core). The increase in magnetic reluctance will tend to reduce energy efficiency slightly. However, the detrimental effect of increased magnetic reluctance will be much smaller than the beneficial effect of the lower electrical resistance of the inductors.

Typically, the magnetic coupling coefficient between the inductors should always be negative (i.e. inverse coupling) because inverse coupling tends to decrease the output current ripple and thereby further improve the energy efficiency. The magnetic coupling coefficient should be as large as possible (in absolute value), but still small enough to ensure that the magnetic core does not saturate. Typically, the magnetic coupling coefficient between the inductors will be in the range of about −0.6 to −0.9. In order to reduce the magnetic coupling coefficient to a value that assures saturation will not occur, a gap (e.g. an air gap) can be provided between the top portions 22a 22b and bottom portions 24a 24b of the magnetic core. An air gap will not be necessary if the magnetic core is so large that it is not in danger of saturation.

Also, an air gap will typically not be needed if the different phases have nearly identical operating currents. This is because the operating currents produce opposing magnetic fields in the magnetic core and will cancel each other if the current in each phase is identical. If the different phases have slightly different operating currents, a residual field will exist, and the residual field can possibly saturate the magnetic core.

In operation, the switches Qt1, Qb1, Qt2, Qb2 are switched alternately to alternately charge and discharge the inductors, as known in the art. The inverse coupling between the inductors tends to reduce the output current ripple and thereby improve the transient response and increase energy efficiency. The inverse coupling tends to increase the ON-state inductance, and decrease the leakage inductance, which both provide beneficial effects.

The ON-state inductance is an apparent inductance in each inductor during the ON-state, when the inductor is charging. It can be calculated from the time rate of change of current (dI/dt) through the inductor and voltage across the inductor. It is important to calculate the ON-state inductance when only a single phase is ON (e.g. when only switch Qt1 is ON, and switches Qb1, Qt2 and Qb2 are OFF). The ON-state inductance is generally increased by the inverse coupling between inductors. This is beneficial because it means that the inductors can store more energy during a charging cycle. It is important to note that the ON-state inductance is not the same as the inductance of the inductor in the absence of the other inductors.

Inverse coupling between inductors also tends to reduce the leakage inductance of the inductors. This is beneficial because it means that the inductors will discharge more rapidly during the OFF-state portion of the operating cycle.

Figure 8:
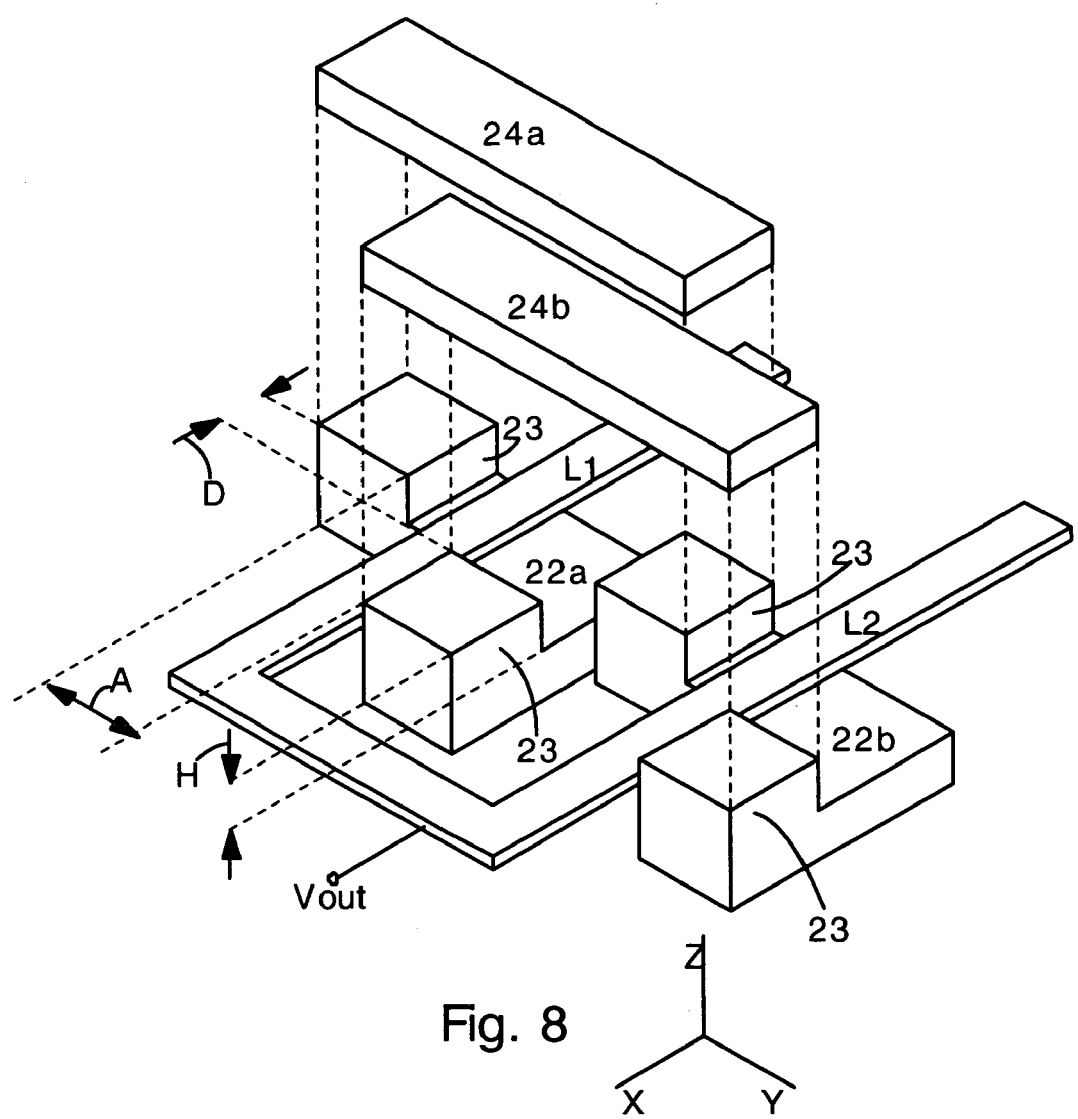
FIG. 8 shows an exploded perspective view of an embodiment of the present invention illustrating dimensions D, H and A important in the design of the magnetic core.

In the present invention, it is generally desirable for the circuit to have a large ON-state inductance and small leakage inductance. Accordingly, a useful figure-of-merit for the present circuits is the ratio Lss/Lk of ON-state inductance Lss to leakage inductance Lk. The shape of the magnetic core can be adjusted in order to increase the Lss/Lk ratio. FIG. 8, for example, shows an exploded perspective view of a 2-phase embodiment with several important dimensions of the magnetic core indicated (for brevity, top and bottom switches Qt1, Qb1, Qt2, Qb2 are not shown):

D: X-distance between posts, and accordingly, distance between top portions 24a 24b;

H: Z-height of the posts 23;

A: Y-distance between posts.

The Lss/Lk ratio can be increased by increasing D, decreasing H, and decreasing A. Therefore, to attain the highest value for the Lss/Lk figure of merit, and best circuit performance, the distance D should be as large as circuit board space will allow; the distance H should be as small as possible (e.g. equal to a Z-thickness of the inductors L1 L2, and, possibly a supporting circuit board), and the distance A should be as small as possible (e.g. equal to a Y-dimension width of the inductors L1 L2. With the values of D, H and A optimized in this way, the ratio Lss/Lk will be as large as possible, and the performance of the magnetic core will be optimized for most applications.

Figure 9:
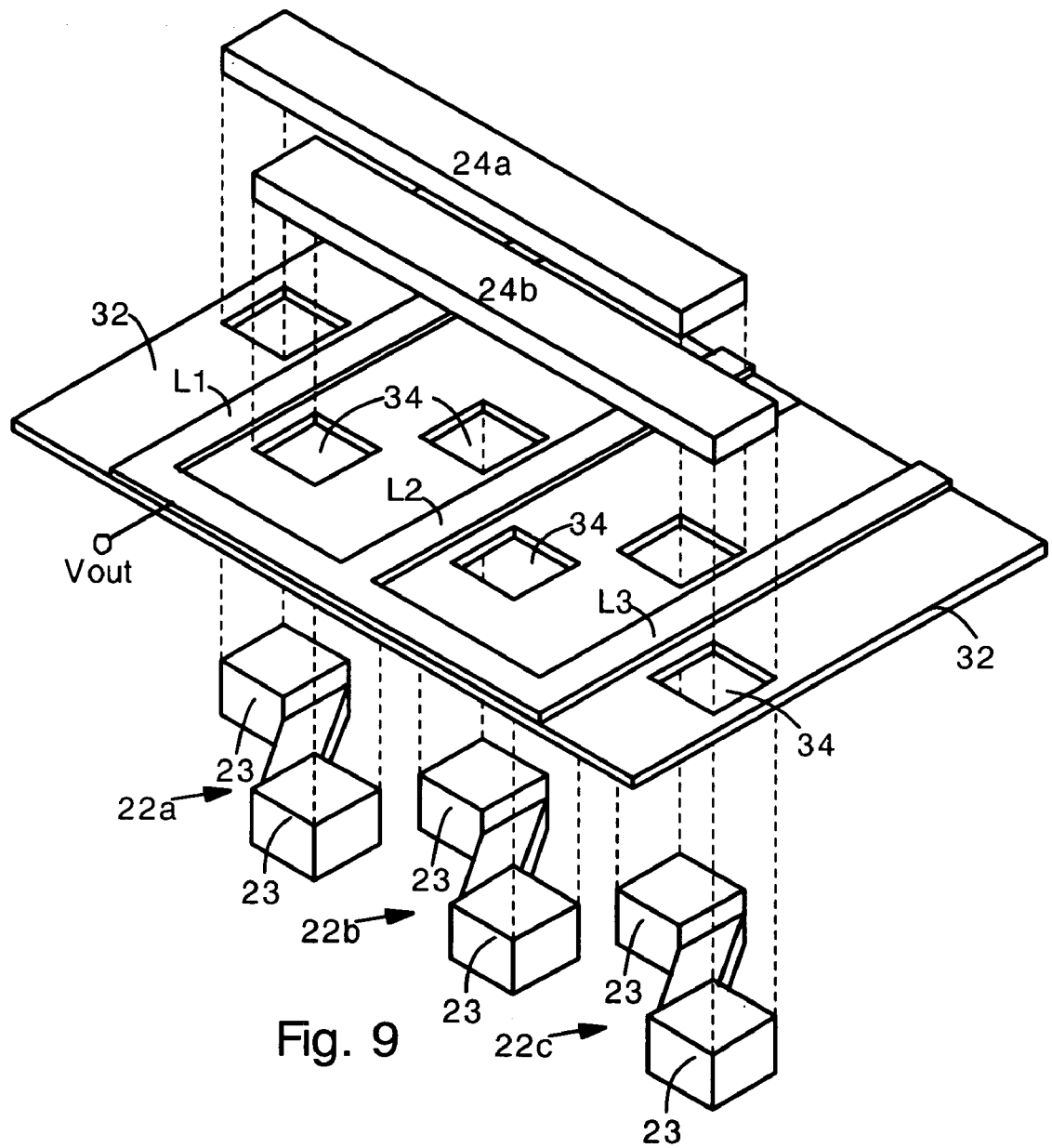
FIG. 9 shows an exploded perspective view of coupled inductors from a 3 phase voltage converter fabricated on a printed circuit board. The circuit board has holes for accommodating the magnetic core.

FIG. 9 shows an exploded perspective view of a 3-phase embodiment of the invention fabricated on a printed circuit board 32. The circuit board has holes 34 for accommodating the posts 23 of the bottom portions 22a 22b 22c of the magnetic core. The inductors L1 L2 L3 are straight, parallel copper traces printed on the circuit board 32. Other portions of the circuit such as the switches Qt1, Qb1, Qt2, Qb2 are not shown.

Figure 10:
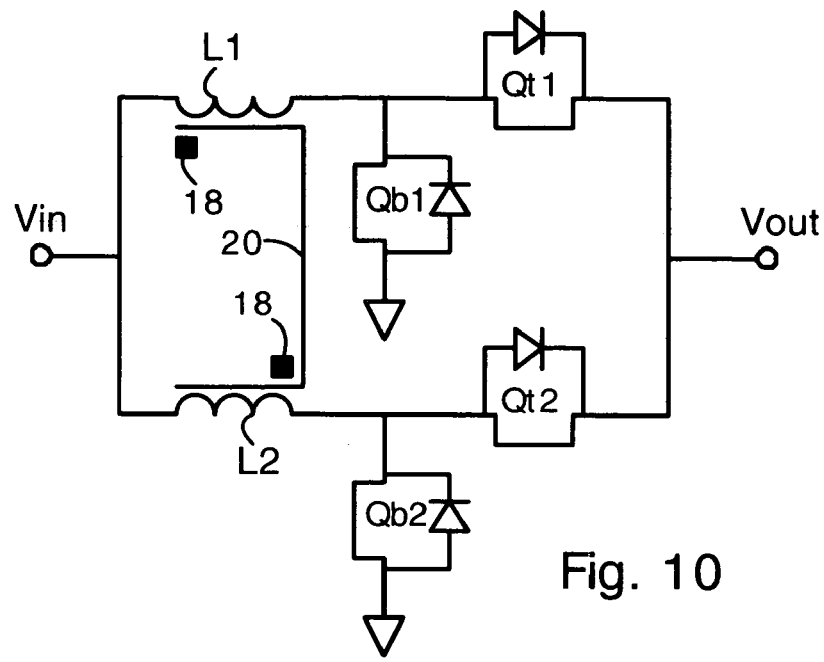
FIG. 10 shows a circuit diagram for a boost converter.

FIG. 10 shows a circuit diagram of a 2-phase boost converter according to the present invention. The circuit has top switches Qt1 Qt2 and bottom switches Qb1 Qb2. The switches alternately charge and discharge the inductors L1 L2. The two phases are operated 180 degrees out of phase. Boost converters can also have 3, 4 or more phases. Boost converters are well known in the art. However, boost converters with inversely coupled output inductors are not well known.

Figure 11:
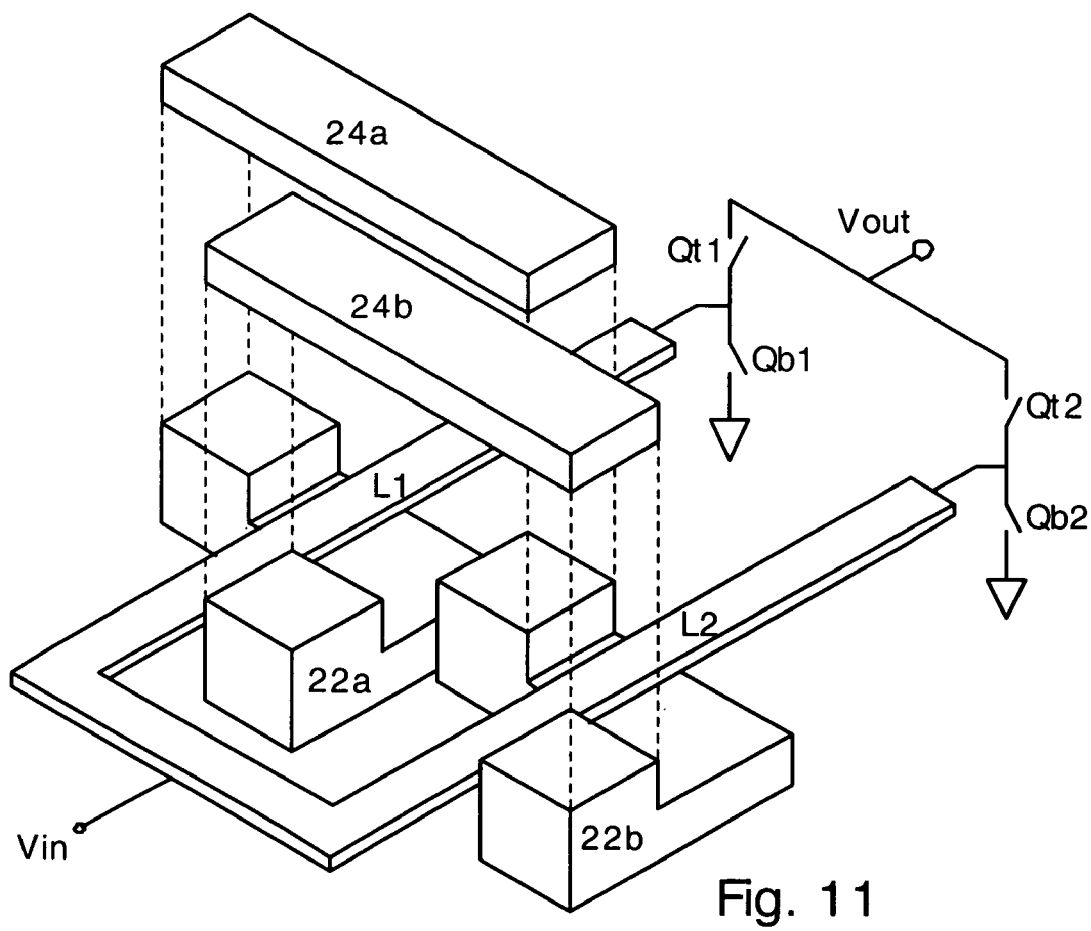
FIG. 11 shows an exploded perspective view of a 2-phase boost converter according to the present invention.

FIG. 11 shows an exploded perspective view of a boost converter according to the present invention. The boost converter of the present invention has a magnetic core with a woven topology that provides inverse coupling between the inductor L1 L2. The magnetic core can comprise top portions 22a 22b and bottom portions 24a 24b. The magnetic core can have any shape in the present invention, provided that it has the woven topology and provides inverse coupling.

Figure 12:
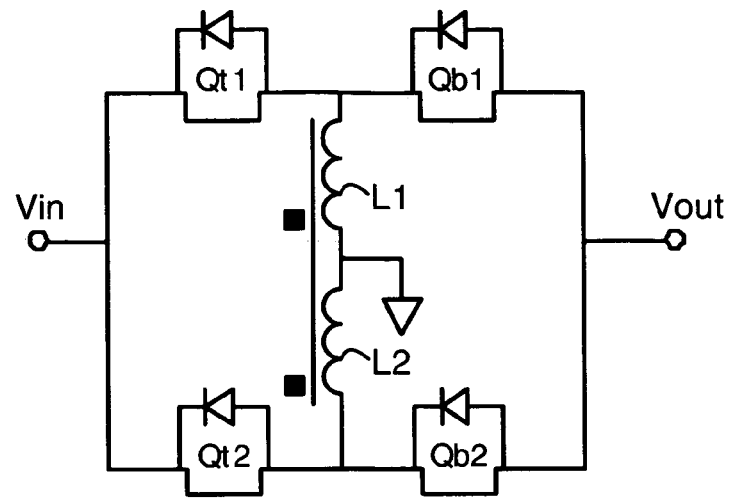
FIG. 12 shows a circuit diagram for a buck-boost converter.

FIG. 12 shows a circuit diagram of a 2-phase buck-boost converter according to the present invention. The circuit has top switches Qt1 Qt2 and bottom switches Qb1 Qb2. The switches alternately charge and discharge the inductors L1 L2. The two phases are operated 180 degrees out of phase. Buck-boost converters can also have 3, 4 or more phases. Buck-boost converters are well known in the art. However, boost converters with inversely coupled output inductors are not well known.

Figure 13:
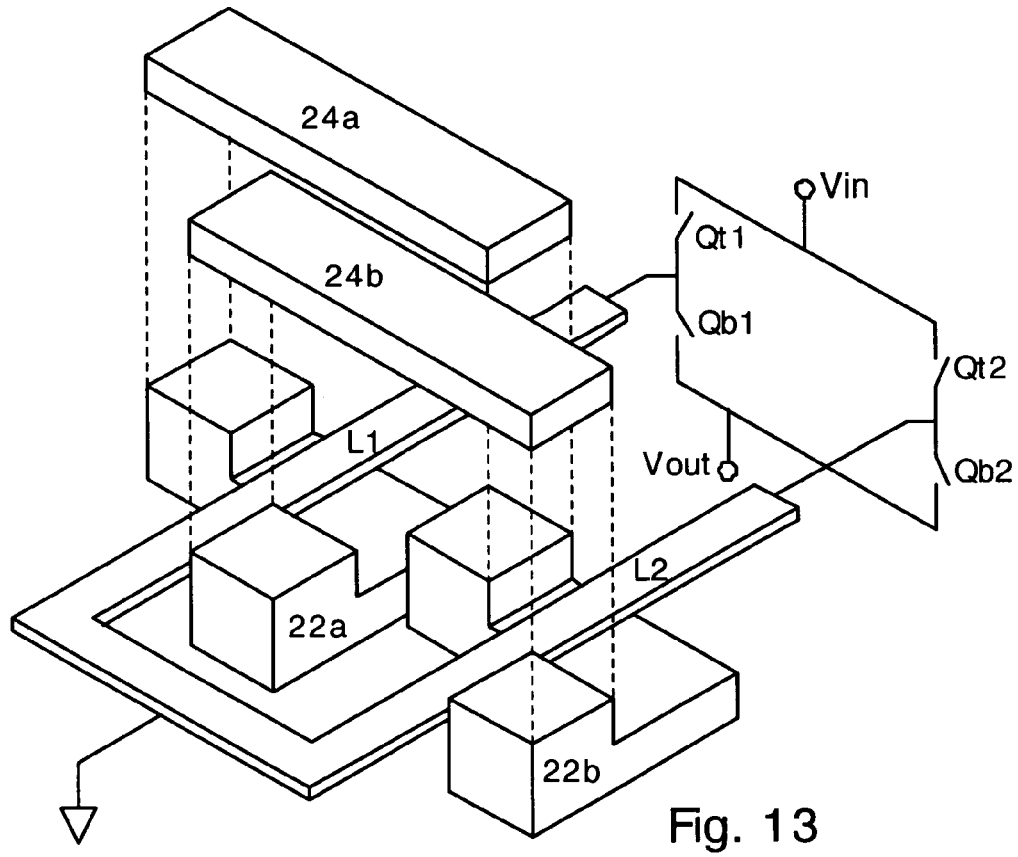
FIG. 13 shows an exploded perspective view of a 2-phase buck-boost converter according to the present invention.

FIG. 13 shows an exploded perspective view of a buck-boost converter according to the present invention. The buck-boost converter of the present invention has a magnetic core with a woven topology that provides inverse coupling between the inductor L1 L2. The magnetic core can comprise top portions 22a 22b and bottom portions 24a 24b. The magnetic core can have any shape in the present invention, provided that it has the woven topology and provides inverse coupling.

The present invention provides a multiphase voltage converter with exceptionally high energy efficiency and exceptionally fast transient response. The inductors have desired amounts of inductance, but very low electrical resistance values since they can be straight conductors. The unique woven topology of the magnetic core allows the inductors to be straight, or at least have a minimal amount of curvature. The multiphase voltage converters of the present invention can operate at exceptionally high frequencies, for example 500 Khz or 1 Mhz or higher for example. The present multiphase converters can be used to increase or decrease or reverse the polarity of the voltage of a power supply. The present multiphase converters can be used in a wide range of applications such as for powering microprocessors and other computers, telecommunications equipment, and linear or analog signal electronics.

It will be clear to one skilled in the art that the above embodiment may be altered in many ways without departing from the scope of the invention. For example, the shapes of the magnetic cores can be changed in many ways without departing from the present invention and scope of the appended claims (provided that the woven topology remains unchanged). Accordingly, the scope of the invention should be determined by the following claims and their legal equivalents.

What is claimed is:

1. A multiphase voltage converter, comprising:
a) a first inductor comprising a non-looping electrical conductor extending, in a first plane, linearly from a first inductor first end to a first inductor second end, along a first linear axis;
b) a second inductor comprising a non-looping electrical conductor extending, in a plane parallel to said first plane, linearly from a second inductor first end to a second inductor second end, along a second linear axis;
c) a magnetic core having
a first top core structure, extending in a direction substantially perpendicular to said first linear direction, crossing over said first inductor at a location between said first inductor first end and said first inductor second end,
a first bottom core structure, having a portion crossing under said first inductor at a location between said first inductor first end and said first inductor second end,
a second top core structure, extending in a direction substantially perpendicular to said second linear direction, crossing over said second inductor at a location between said second inductor first end and said second inductor second end, and a second bottom core structure, having a portion crossing under said second inductor at a location between said second inductor first end and said second inductor second end.

2. The multiphase voltage converter of claim 1, wherein the first linear axis and said second linear axis are essentially parallel.

3. The multiphase voltage converter of claim 1, wherein
said first bottom core structure of the magnetic core includes two posts extending substantially normal to said plane, arranged such that a length of said first inductor, having a width A' passes through a space of width A between opposing faces of said two posts, said second bottom core structure includes two posts extending substantially normal to said plane, arranged such that said second inductor passes between said two posts, said first top core structure is magnetically connected between one of the posts of the first bottom core and one of the posts of the second bottom core structure, and said second top core structure is magnetically connected between the other of the posts of the first bottom core and the other of the posts of the second bottom core structure.

4. The multiphase voltage converter of claim 1, wherein a said width A of the magnetic core is less than 10% greater than said width A' of said length of said first inductor.

5. The multiphase voltage converter of claim 3, wherein the first and second inductors comprise straight circuit traces on a printed circuit board, and the printed circuit board has holes, and said posts extend through said holes.

6. A multiphase voltage converter, comprising:
a) a magnetic core;
b) a first phase circuit comprising
1) a first inductor that is non-looping with respect to the magnetic core, and
2) top and bottom switches operable for alternately charging and discharging the first inductor; and
c) a second phase circuit comprising
1) a second inductor that is non-looping with respect to the magnetic core, and
2) top and bottom switches operable for alternately charging and discharging the second inductor, wherein
said first inductor extends, in a first plane, linearly from a first inductor first end to a first inductor second end, along a first linear axis,
said second inductor extends, in a plane parallel to said first plane, linearly from a second inductor first end to a second inductor second end, along a second linear axis, and
wherein the magnetic core is constructed and arranged with a woven topology around the first and second inductors such that the first and second inductors are inversely coupled to said core, said construction and arrangement including:
i) a first top core structure, extending in a direction substantially perpendicular to said first linear direction, crossing over said first inductor at a location between said first inductor first end and said first inductor second end, ii) a first bottom core structure, having a portion crossing under said first inductor at a location between said first inductor first end and said first inductor second end, iii) a second top core structure, extending in a direction substantially perpendicular to said second linear direction, crossing over said second inductor at a location between said second inductor first end and said second inductor second end, and iv) a second bottom core structure having a portion crossing under said second inductor at a location between said second inductor first end and said second inductor second end.

7. The multiphase voltage converter of claim 6, wherein said first and said second linear axes are substantially parallel.

8. The multiphase voltage converter of claim 6, wherein
said first bottom core structure of the magnetic core includes two posts extending substantially normal to said plane, arranged such that a length of said first inductor, having a width A' passes through a space of width A between opposing faces of said two posts, said second bottom core structure includes two posts extending substantially normal to said plane, arranged such that said second inductor passes between said two posts, said first top core structure is magnetically connected between one of the posts of the first bottom core and one of the posts of the second bottom core structure, and said second top core structure is magnetically connected between the other of the posts of the first bottom core and the other of the posts of the second bottom core structure.

9. The multiphase voltage converter of claim 1, wherein said width A of the magnetic core is less than 10% greater than said width A' of said length of said first inductor.

10. The multiphase voltage converter of claim 8, wherein the first and second inductors comprise straight circuit traces on a printed circuit board, the printed circuit board has holes, and said posts extend through said holes.

11. The multiphase voltage converter of claim 6, further comprising a third phase circuit comprising:
a third inductor that is non-looping with respect to the magnetic core, extending, in a plane parallel to said first plane, linearly from a third inductor first end to a third inductor second end, along a third linear axis;
top and bottom switches operable for alternately charging and discharging the third inductor, wherein
said first top core structure further extends, in a direction substantially perpendicular to said third linear direction, to cross over said third inductor at a location between said third inductor first end and said third inductor second end, and wherein said magnetic core further comprises
a third bottom core structure, having a portion crossing under said third inductor at a location between said third inductor first end and said third inductor second end.

12. The multiphase voltage converter of claim 11, further comprising a third phase circuit comprising:
a fourth inductor that is non-looping with respect to the magnetic core, extending, in a plane parallel to said first plane, linearly from a fourth inductor first end to a fourth inductor second end, along a fourth linear axis; and top and bottom switches operable for alternately charging and discharging the fourth inductor, wherein said first top core structure further extends, in a direction substantially perpendicular to said first linear direction, to cross over said fourth inductor at a location between said fourth inductor first end and said fourth inductor second end, and wherein said magnetic core further comprises a fourth bottom core structure, having a portion crossing under said fourth inductor at a location between said fourth inductor first end and said fourth inductor second end.

13. A multiphase voltage converter, comprising:
    a) a magnetic core;
    b) a first phase circuit comprising:
       1) top and bottom first switches connected in series between a voltage source and ground, and
       2) a first inductor that is non-looping with respect to the magnetic core, extending in a first plane, linearly from a first inductor first end to a first inductor second end, along a first linear axis, wherein the first inductor is connected between a midpoint of the switches and a voltage output, and the top and bottom switches are constructed and arranged to alternately charge and discharge the first inductor; and
    c) a second phase circuit comprising:
       1) a second inductor that is non-looping with respect to the magnetic core extending parallel to said first plane, linearly from a second inductor first end to a second inductor second end, along a second linear axis, and
       2) top and bottom switches connected in series between a voltage source and ground, wherein the second inductor is connected between a midpoint of the second switches and a voltage output, wherein
    the magnetic core is constructed and arranged with a woven topology around the first and second inductors such that the first and second inductors are inversely coupled to said core, said construction and arrangement including:
       i) a first top core structure, extending in a direction substantially perpendicular to said first linear direction, crossing over said first inductor at a location between said first inductor first end and said first inductor second end,
       ii) a first bottom core structure, having a portion crossing under said first inductor at a location between said first inductor first end and said first inductor second end,
       iii) a second top core structure, extending in a direction substantially perpendicular to said second linear direction, crossing over said second inductor at a location between said second inductor first end and said second inductor second end, and
       iv) a second bottom core structure, having a portion crossing under said second inductor at a location between said second inductor first end and said second inductor second end.

14. The multiphase voltage converter of claim 13, wherein said first linear axis and said second linear axis are essentially parallel.

15. A multiphase voltage converter comprising:
    a magnetic core including:
        a pair of longitudinal top core members, extending in a top plane, substantially parallel to one another;
        a plurality of bottom core members, each having a coupling portion spaced a distance under said top plane, and each magnetically connected between said pair of longitudinal top core members by a pair of ferrite posts extending normal to said top plane; and
        a plurality of inductors, extending in an inductor plane substantially co-planar with said top plane, substantially collinear with a straight line connecting a respective inductor start location adjacent one side of said pair of longitudinal top core members to a respective inductor end location adjacent the other side of said pair of longitudinal top core members, wherein
    each inductor start location, inductor end location, and the respective straight line connecting said locations are such that the distance along the straight line between its intersection with one of the longitudinal top core members and its intersection with the other of the longitudinal top core members represents the shortest path between said longitudinal top core members passing through either of said intersections.

* * * * *